United States Patent [19]

Machado et al.

[11] Patent Number: 5,079,301

[45] Date of Patent: Jan. 7, 1992

[54] MOLECULARLY MISCIBLE POLYMER BLENDS OF POLYVINYL PHENOL AND POLYACETAL

[75] Inventors: Joseph M. Machado, Richmond; Raymond N. French, Missouri City, both of Tex.

[73] Assignee: Shell Oil Company, Houston, Tex.

[21] Appl. No.: 564,212

[22] Filed: Aug. 8, 1990

[51] Int. Cl.⁵ .............................................. C08L 61/02
[52] U.S. Cl. ................................................... 525/154
[58] Field of Search ......................................... 525/154

[56] References Cited

U.S. PATENT DOCUMENTS 4,221,700  9/1980  Minagawa et al. ................. 525/154
4,816,530  3/1989  Lutz et al. ........................... 525/539
4,822,862  4/1989  Rupp et al. .......................... 525/378

FOREIGN PATENT DOCUMENTS 3088161  8/1978  Japan .
3088162  8/1978  Japan .

Primary Examiner—Melvyn I. Marquis
Assistant Examiner—Thomas Hamilton, III
Attorney, Agent, or Firm—Denise Y. Wolfs

[57] ABSTRACT

A molecularly miscible polymer blend of polyvinyl phenol and polyacetal exhibits useful properties.

20 Claims, No Drawings

MOLECULARLY MISCIBLE POLYMER BLENDS OF POLYVINYL PHENOL AND POLYACETAL

FIELD OF THE INVENTION

This invention is concerned with molecularly miscible polymer blends of polyvinyl phenol and polyacetal.

BACKGROUND OF THE INVENTION

The mixing together of two or more polymers has attracted interest as a means of arriving at new property combinations without the need to snythesize novel structures. In most cases, when two polymers are mixed, the components tend to segregate into separate phases, forming a non-adhering, heterogeneous mixture that exhibits inferior overall properties. Only occasionally do polymers blend to form a single homogeneous amorphous phase.

The term polymer blend refers to an intimate mixture of two or more polymers. Blends of polymers are often described as miscible or compatible, and the terms are sometimes considered to be equivalent. The term miscible will be used herein to describe a mixture of two or more polymers that form a single-phase solution (solid or liquid) on a molecular scale within the amorphous phase. When one or both of the polymer blend components is capable of forming both a crystalline and an amorphous phase, then the term miscible refers only to the amorphous phase in which the separate components are capable of mixing on the molecular level.

Miscibility can be achieved by selecting components that interact with one another in an attractive mode (e.g. which mix exothermically). Several methods can be used to determine miscibility in polymer blends. For example, when a film is prepared from a miscible blend, it is usually optically clear, while immiscible blend films are usually opaque. However, this criterion is not useful when one of the blend components is crystallizable.

The most commonly used criterion for miscibility is the existence of a single glass transition temperature for a given miscible blend. This parameter is relatively easy to measure for amorphous systems, and rapid if a technique such as differential scanning calorimetry is used. Greater sensitivity, especially useful for semicrystalline blends, can be obtained when dynamic mechanical methods are employed to measure the glass transition temperature. As the relative proportion of components changes, a smooth change between the glass transition temperatures for the pure blend components and the glass transition temperatures for the various blends will be observed over the miscible range for the blends.

SUMMARY OF THE INVENTION

The present invention is a molecularly miscible blend of polyvinyl phenol and polyacetal.

DETAILED DESCRIPTION OF THE INVENTION

Molecularly miscible blends are herein defined as blends which can be mixed such that they exhibit only one glass transition temperature, indicating a single amorphous phase. More specifically, molecularly miscible blends exhibit one glass transition temperature ($T_g$) as measured by dynamic mechanical testing. In this procedure, polymers are subjected to an oscillatory mechanical deformation to detect changes in the modulus and visco-elastic response of the polymer blend as a function of temperature.

It has been found in accordance with the instant invention that the desired molecularly miscible blends can be obtained by blending together a compatible mixture of (a) a polyvinyl phenol polymer, with (b) a polyacetal polymer, wherein components (a) and (b) are blended in relative proportions by weight within a range of from 1:99 to 99:1 parts based on 100 parts of (a) and (b) combined.

The most preferred molecular miscible blend is prepared from about 80 to about 20 parts of (a) and, correspondingly, from about 20 to about 80 parts of (b). Blends of components (a) and (b) which are also usable can range in relative proportions from about 40:60 to about 60:40, or be approximately equal proportions by weight, i.e. (a):(b)=50:50.

The polyvinyl phenols employed as the first component in the molecularly miscible blends of the invention are homopolymers and copolymers of ortho-, meta- and para-vinyl phenols. Polyvinyl phenols may be illustrated by the following formula for para-vinyl phenol:

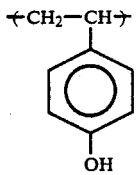

The vinyl phenols polymerized may be non-substituted or may carry any of various substituents that do not markedly affect the phase behavior of the polymer blend.

The molecular weight of the polymer does not appear to be a critical factor. Those having a number average molecular weight of between 2,000 and 75,000 are preferred, but the polymers having molecular weights lower or higher than this range may also be used.

The polyvinyl phenol may be prepared by bulk polymerization, emulsion polymerization or solution polymerization of the corresponding monomers in the presence of a cationic catalyst such as boron trifluoride etherate. Such procedures are well known in the art.

High purity para-vinyl phenol polymers may be prepared by several methods known in the art. A high purity para-vinyl phenol polymer may be produced by polymerizing para-vinyl phenol in the presence of phenols without unsaturated side chains, and in the presence of a polymerization accelerator. High purity para-vinyl phenol may also be produced by dehydrogenating crude para-ethylphenol, polymerizing the resulting crude para-vinyl phenol without purification, and then purifying the resulting polymerization product. Hoechst Celanese commercially produces a high purity para-vinyl phenol polymer by polymerization of a high purity para-acetoxystyrene monomer, followed by hydrolysis to para-vinyl phenol polymer.

Vinyl phenols useful for the production of polymers may be prepared, for example, by hydrolysis of commercially available coumarin or substituted coumarins, followed by decarboxylation of the resulting hydroxy cinnamic acids. Useful vinyl phenols may also be prepared by dehydration of the corresponding hydroxy alkyl phenols or by decarboxylation of hydroxy cinnamic acids resulting from the reaction of substituted or non-substituted hydroxybenzaldehydes with malonic acid. Various processes suitable for production of vinyl phenol are well known in the art.

Polyvinyl phenols are described in U.S. Pat. No. 3,869,292 (Peters) and in U.S. Pat. No. 4,439,516 (Cernigliaro et al.), both of which are incorporated herein by reference, and in European Patent Application 138,609 (Nippon Oil). The production of high-purity p-vinyl phenols is described in U.S. Pat. No. 4,028,340 (Kanezaki) and in U.S. Pat. No. 4,517,349 (Fujiwara et al.), both of which are incorporated herein by reference.

The polyacetal polymer employed as the second component in the blends of the invention is a polyoxyalkylene polymer which is at least predominantly a polyoxymethylene polymer. The polymer is illustratively produced by polymerization of formaldehyde, provided as such or from a formaldehyde source, and optionally has polymerized therewith a small proportion of a second compound such as a low molecular weight cyclic ether which is not a formaldehyde source. One preferred formaldehyde source is 1,3,5-trioxane which is viewed as a formaldehyde trimer. The cyclic ether which is preferred as an optional comonomer of the polyacetal polymer is a low molecular weight cyclic ether of up to 10 carbon atoms inclusive and up to 2 oxygen atoms inclusive. One class of such cyclic ethers is the group of compounds known as oxirane compounds or olefin oxides having two carbon atoms and one oxygen atom in a cyclic three-membered ring. Such olefin oxides have up to 10 carbon atoms inclusive and are suitably hydrocarbon olefin oxides such as ethylene oxide, propylene oxide, 2-butylene oxide and 1-octene oxide or are halohydrocarbon olefin oxides, preferably chlorohydrocarbon olefin oxides such as epichlorohydrin. Other cyclic ethers with one oxygen but more than two carbon atoms in the ring are the polymethylene oxides including hydrocarbon polymethylene oxides such as trimethylene oxide, tetramethylene oxide and pentamethylene oxide as well as halohydrocarbon, preferably chlorohydrocarbon, polymethylene oxides such as 2,2-di(chloromethyl)trimethylene oxide. Cyclic ethers of more than one oxygen in the ring, such as 1,3-dioxlane and 1,4-dioxane, are preferred.

The polyacetal resin prepared from formaldehyde has a high molecular weight and a structure typified by the following:

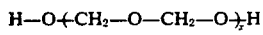

where terminal groups are derived from controlled amounts of water and the x denotes a large (typically 1500) number of formaldehyde units linked in head-to-tail fashion. To increase thermal and chemical resistance, terminal groups are typically converted to esters or ethers.

Also included in the term polyacetal resins are the polyacetal copolymers, such as those listed in British Patent No. 807,589 (Du Pont), which include other monomers capable of providing active hydrogens, such as alkylene glycols, polythiols, vinyl acetate/acrylic acid copolymers, or reduced butadiene/acrylonitrile polymers.

Preferred polyacetal polymers comprise at least 85 mole percent, preferably at least 90 mole percent, based on total polyacetal polymer of polyoxymethylene, the unit derived from formaldehyde, with an optional amount of no more than 15 mole percent, preferably no more than 10 mole percent, based on total polyacetal polymer, of a cyclic ether polymerized with the polyoxyalkylene. Although block copolymers of formaldehyde are known wherein a polyoxymethylene block is attached to a block of a second polymerized monomer, e.g., the cyclic ether, the preferred polyacetal polymers, when copolymers are employed, are the more typical random copolymers, wherein the monomers are copolymerized and the moieties of cyclic ether occur randomly throughout the polymer chain. Although such copolymers are suitable for the blends of the invention it is generally preferred to use homopolymers of formaldehyde without any substantial amount of comonomer.

Such preferred polyacetal polymers, are represented by the repeating formula

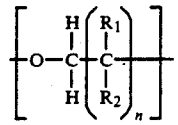

wherein each $R_1$ and $R_2$ independently is hydrogen, an alkyl radical containing up to 4 carbon atoms, or a haloalkyl of up to 4 carbon atoms and 2 halogens inclusive, preferably a haloalkyl of up to 1 halogen wherein the halogen is chloro, and n is an integer from 0 to 3 inclusive, with n being 0 in at least 85% of the repeating units. These polyacetal polymers are produced by polymerizing at least 85 mole percent of formaldehyde with up to 15 mole percent, based on total polyacetal polymer, of the cyclic ether of the formula

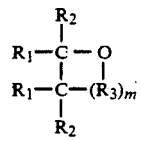

wherein each $R_1$ and $R_2$ is hydrogen, an alkyl of up to 4 carbon atoms inclusive, or a haloalkyl of up to 4 carbon atoms and 2 halogens inclusive, preferably haloalkyl of up to 1 halogen wherein the halogen is chloro; $R_3$ is methylene, oxymethylene, alkyl on haloalkyl substituted methylene, or alkyl or haloalkyl substituted oxymethylene; and m is an integer from 0 to 3 inclusive. Illustrative cyclic ethers are described above. Preferred cyclic ethers for copolymerization with formaldehyde when copolymer polyacetal polymers are employed are ethylene oxide and 1,3-dioxolane. Certain of the preferred formaldehyde/ethylene oxide copolymers are commercially available and are marketed by Hoechst Celanese under the tradename CELCON ® Polyacetal. A polyacetal molding composition is described in U.S. Pat. No. 4,274,986 (Ikenaga et al.), assigned to Celanese, and incorporated herein by reference. Other polyacetal homopolymers and copolymers are available from DuPont under the tradename DELRIN ® Polyacetal.

The polyacetal polymers are produced by polymerization of formaldehyde (or a formaldehyde source) and, optionally, up to 15 mole percent of the cyclic ether comonomer in the presence of a Friedel Crafts catalyst, preferably complexed with an electron-rich molecule. The Friedel Crafts catalysts are metal halides having acidic properties. This class of catalysts include the halides but preferably the fluorides or chlorides of boron, aluminum, iron, tin and other metals as is known in the art. The catalysts are often provided as a complex of an electron-rich oxygen compound such as an ether, but complexes with an alkanol or an alkanoic acid are also suitable. The production of polyacetal polymers is well known in the art and is taught by U.S. Pat. No. 2,947,727 and U.S. Pat. No. 2,947,728 (both Bartz), U.S. Pat. No. 3,027,352 (Walling) and U.S. Pat. No. 3,072,609 (Berardinelli).

The method of blending the polyvinyl phenol and the polyacetal is not material so long as a uniform mixture of the two components is obtained without undue degradation of the components or the resulting blend. For example, the components may be blended in a corotating twin-screw extruder, or in a mixing device which exhibits high shear.

The blends of the invention may also contain additives and stabilizers, fillers and fire retardant materials, mold release agents, colorants and other materials which are designed to improve the processability of the blend or its components, or to improve the properties of the resulting blend. Such additives are incorporated within the blend or blend components prior to, together with or subsequent to the blending of the polyvinyl phenol or polyacetal polymer.

The polyvinyl phenol/polyacetal blends of the invention are miscible blends having unique properties. The blends are of particular utility in instances where molded parts are desired which exhibit strength when exposed to conditions of high temperature. The blends are processed by conventional methods, such as extrusion or injection molding, into sheets, plates, films and molded objects. The blends find particular utility in the production of both internal and external parts for the automotive industry and structural parts for application in the construction industry. The miscible blends of the invention, when filled with reinforcing materials such as metal or glass, will exhibit good adhesion due to the high reactivity and hydrogen-bonding capability of the blends. The blends of the invention could also be used as coatings for materials such as glass or metal.

The invention is further illustrated by the following Examples, which should not be construed as limiting the invention.

EXAMPLE 1

Melt blends were prepared containing a polyvinyl phenol having a number average molecular weight of 8700 and a density of 1.16 g/cc, purchased from Hoechst Celanese, and a molding grade polyacetal copolymer with a density of 1.42 g/cc, CELCON M-90, purchased from Hoechst Celanese. The blends prepared are shown in Table 1. The blends were compounded on a 15 mm Baker-Perkins co-rotating, intermeshing twin screw extruder operating at 235° C. Subsequent to blending, specimens of the blends were compression molded at 225° C. into plaques. The molded specimens were stored over desiccant prior to testing.

Miscibility of the two blend components was demonstrated by determining the glass transition temperature ($T_g$) and melting point ($T_m$) for each blend. The $T_g$ of the blends was determined by the temperature at which the dynamic mechanical loss tangent, tan delta, reached a maximum value in mechanical torsion at 1 Hz frequency and low strain amplitude. The $T_g$ of polyvinyl phenol was measured by differential scanning colorimetry (DSC) at 20° C./min heating rate. The pure polyvinyl phenol sample was too brittle for dynamic mechanical testing. The $T_g$ of polyacetal is a continuing matter of controversy (not unusual for highly crystalline polymers), but is thought to correspond to a loss peak at $-6°$ C. Melting point analysis was performed by DSC at 20° C./min on compression molded samples. Reported melting temperatures correspond to the peak temperature of the DSC melting endotherm.

TABLE 1

| Composition (PVP/PAc)[a] | $T_g$ (°C.) | $T_m$ (°C.) |
| --- | --- | --- |
| 100/0 | 153[b] | — |
| 70/30 | 141 | 143 |
| 50/50 | 132 | 159 |
| 40/60 | 113 | 162 |
| 30/70 | 103 | — |
| 20/80 | 92 | 168 |
| 10/90 | 83 | — |
| 0/100 | $-6$[c] | 170 |

Notes:
[a] PVP = polyvinyl phenol; PAc = polyacetal.
[b] Sample was too brittle for dynamic mechanical testing, so $T_g$ was determined by differential scanning calorimetery (DSC).
[c] Because of its highly crystalline nature, the true $T_g$ of amorphous polyacetal is somewhat uncertain.

As noted in Table 1, the glass transition temperatures for the blends decline in a nearly linear fashion from the $T_g$ for polyvinyl phenol (153° C.) upon adding polyacetal to the blend. The melting point temperatures of the polyacetal crystalline phase decrease in a smooth transition from the $T_m$ for pure polyacetal (170° C.).

As polyvinyl phenol was added to the polyacetal, the morphology, viewed by optical microscopy, changed considerably. The spherulites became larger and developed a marked "ringed" or "bonded" texture (caused by a periodic twisting of the lamellae) which is not present in the neat polyacetal. This phenomenon has previously been reported for the polycaprolactone/polyvinyl chloride and polyvinylidene fluoride/poly-3-hydroxy butyrate blend systems which are known to be miscible systems. It may also be pointed out that the blend spherulites were space-filling (and therefore included the polyvinyl phenol component). Scanning transmission electron microscopy (STEM) showed no evidence of a dispersed, discrete phase, also suggesting miscibility. Thus, the observation of a single intermediate glass transition accompanied by a depression of the melting point of the crystalline component, combined with morphological observations, provides compelling evidence that the blends of the invention are miscible.

EXAMPLE 2

Melt blends were prepared containing a polyvinyl phenol having a number average molecular weight of 50,500 and a density of 1.16 g/cc, purchased from Hoechst Celanese, and a molding grade polyacetal copolymer with a density of 1.42 g/cc, CELCON M-90, as described in Example 1. The blends prepared are compared with the individual polymers in Table 2.

TABLE 2

| Composition (PVP/PAc) | $T_g$ (°C.) | $T_m$ (°C.) |
| --- | --- | --- |
| 100/0 | 179[b] | — |
| 40/60 | 120 | 166.5 |
| 20/80 | 100 | 167.2 |

TABLE 2-continued

| Composition (PVP/PAc) | $T_g$ (°C.) | $T_m$ (°C.) |
|---|---|---|
| 0/100 | −6[c] | 170 |

Notes:
[a]PVP = polyvinyl phenol; PAc = polyacetal
[b]Sample was too brittle for dynamic mechanical testing, so $T_g$ was determined by differential scanning calorimetery.
[c]Because of its highly crystalline nature, the true $T_g$ of amorphous polyacetal is somewhat uncertain.

Miscibility of the blends is again demonstrated by the single and intermediate glass transition temperatures and depressed melting point temperatures for the blends.

What is claimed is:

1. A composition comprising a miscible blend of a non-substituted polyvinyl phenol polymer and a polyacetal polymer, wherein the polyacetal polymer comprises at least about 85 mole percent polyoxymethylene copolymerized with no more than about 15 mole percent of a cyclic ether, based on total polyacetal polymer.

2. The composition of claim 1 wherein the polyvinyl phenol polymer is produced by polymerizing a high purity para-acetoxystyrene monomer, followed by hydrolysis to form a high purity para-vinyl phenol polymer.

3. The composition of claim 1 wherein the polyoxymethylene is produced by the polymerization of formaldehyde, and the cyclic ether copolymerized therewith is 1,3-dioxolane or 1,4-dioxane.

4. The composition of claim 1 wherein the polyoxymethylene is produced by the polymerization of a formaldehyde source, and the cyclic ether copolymerized therewith is 1,3-dioxolane or 1,4-dioxane.

5. The composition of claim 4 wherein the polyoxymethylene is produced by the polymerization of 1,3,5-trioxane.

6. The composition of claim 1 wherein the polyacetal polymer comprises at least about 90 mole percent polyoxymethylene copolymerized with no more than about 10 mole percent of a cyclic ether, based on total polyacetal polymer.

7. The composition of claim 1 comprising from about 80 to about 20 parts of polyvinyl phenol polymer and from about 20 to about 80 parts of polyacetal polymer, based on total miscible blend.

8. The composition of claim 1 comprising from about 40 to about 60 parts of polyvinyl phenol polymer and from about 60 to about 40 parts of polyacetal polymer, based on total miscible blend.

9. An article prepared from the composition of claim 1.

10. An article prepared from the composition of claim 1 and a filler.

11. An article coated with the composition of claim 1.

12. A composition comprising a miscible blend of a non-substituted polyvinyl phenol polymer and a polyoxymethylene polymer.

13. The composition of claim 12 wherein the polyvinyl phenol polymer is produced by polymerizing a high purity para-acetoxystyrene monomer, followed by hydrolysis to form a high purity para-vinyl phenol polymer.

14. The composition of claim 12 wherein the polyoxymethylene is produced by the polymerization of formaldehyde.

15. The composition of claim 12 wherein the polyoxymethylene is produced by the polymerization of a formaldehyde source.

16. The composition of claim 15 wherein the formaldehyde source is 1,3,5-trioxane.

17. The composition of claim 12 comprising from about 80 to about 20 parts of polyvinyl phenol polymer and from about 20 to about 80 parts of polyoxymethylene polymer, based on total miscible blend.

18. The composition of claim 12 comprising from about 40 to about 60 parts of polyvinyl phenol polymer and from about 60 to about 40 parts of polyoxymethylene polymer, based on total miscible blend.

19. An article prepared from the composition of claim 12.

20. An article prepared from the composition of claim 12 and a filler.

* * * * *